United States Patent [19]

Luxon

[11] 4,384,063
[45] May 17, 1983

[54] POLYPHENYLENE ETHER RESIN COMPOSITIONS CONTAINING ANTISTATIC AGENTS

[75] Inventor: Bruce A. Luxon, Delmar, N.Y.

[73] Assignee: General Electric Company, Pittsfield, Mass.

[21] Appl. No.: 291,923

[22] Filed: Aug. 11, 1981

[51] Int. Cl.³ .................................................. C08K 5/19
[52] U.S. Cl. .................................... 524/159; 524/308; 524/310; 524/314; 524/317; 524/611; 528/173
[58] Field of Search ............... 525/5, 6; 524/159, 308, 524/310, 314, 317, 611; 528/173

[56] References Cited

U.S. PATENT DOCUMENTS 3,699,066 10/1972 Hunsucker ........................... 524/159
3,933,779 1/1976 Baron et al. ........................ 524/159
4,123,475 10/1978 Abolins et al. ...................... 524/159

*Primary Examiner*—Lester L. Lee
*Attorney, Agent, or Firm*—Hedman, Casella, Gibson, Costigan & Hoare

[57] ABSTRACT

Polyphenylene ether resins having improved properties are described. These resins contain minor effective amounts of an antistatic agent comprising N,N-bis-(2-hydroxyethyl)-N-octyl-N-methyl ammonium para toluene sulfonate salt, preferably with polyethylene glycol ester also present. In addition to serving as an enhancer for the antistatic agent, the polyethylene glycol ester also improves such properties as odor and impact strength.

8 Claims, No Drawings

POLYPHENYLENE ETHER RESIN COMPOSITIONS CONTAINING ANTISTATIC AGENTS

BACKGROUND OF THE INVENTION

The term "polyphenylene ether resin" is well known as defining a class of thermoplastic materials which possess outstanding physical properties, including hydrolytic stability, dimensional stability and excellent dielectric characteristics. Methods of preparation are known in the art and described in the patent literature, e.g., Hay, U.S. Pat. Nos. 3,306,874 and 3,306,875 and Stamatoff, U.S. Pat. Nos. 3,257,357 and 3,257,358, incorporated herein by reference to save unnecessary detail. Other patents which show the preparation of polyphenylene ether resins include Bennett and Cooper, U.S. Pat. Nos. 3,369,656 and 3,838,102, as well as Cooper and Bennett, U.S. Pat. Nos. 3,642,699, 3,661,839 and 3,733,299, also incorporated herein by reference.

It is known that when the polyphenylene ether resins are combined with styrene resins, the resulting compositions possess properties which are improved over the corresponding properties of either resin alone. See Cizek, U.S. Pat. No. 3,383,435, the disclosure of which is incorporated herein by reference.

A shortcoming of some thermoplastic materials is their tendency to accumulate surface electrostatic charges. Thermoplastic materials having characteristic resistivities in the range of from about $10^{10}$ to $10^{12}$ ohms normally do not hold static charges. On the other hand, thermoplastic materials characterized by resistivities in the range of from about $10^{16}$ to $10^{18}$ ohms often develop high static voltages, and polyphenylene ether resins and composites of polyphenylene ether resins with styrene resins fall into this latter group.

Such static charges develop during processing and/or during normal use after molding. They are undesirable for a number of reasons: surface static charges readily attract dust and other contaminants which are unsightly and difficult to clean; often the contaminants or static charges themselves cause processing problems; the charges may accumulate to a level where an unpleasant electrical shock is imparted upon touching; in addition, a high level of static charges in a molded part covering sensitive electronic equipment may be undesirable.

In U.S. Pat. No. 3,933,779 of Baron et al there is disclosed an antistatic polymer blend comprising a synthetic polymer and a certain antistatically effective compound.

In U.S. Pat. No. 4,123,475 of Abolins et al there is disclosed an invention which greatly reduces development of these charges. Therein, a minor, effective amount of a mixture of triethanolamine, toluene sulfonic acid and sodium lauryl sulfate is employed as an antistatic agent. Notwithstanding the advance in the art obtained pursuant to that invention, however, further improvement in the properties of polyphenylene ether resins is desirable.

INTRODUCTION TO THE INVENTION

This invention involves an antistatic thermoplastic composition which comprises:
(a) a polyphenylene ether resin with or without a styrene resin; and
(b) a minor, effective amount of an antistatic agent comprising a compound having the formula:

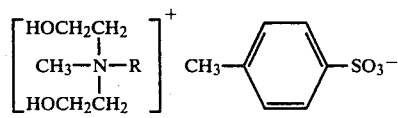

wherein R is a octyl.

Preferably, but not necessarily, the composition further comprises
(c) a minor, effective amount of an enhancer for the antistatic agent, comprising polyethylene glycol ester.

In accordance with the present invention, the polyethylene glycol ester enhancer serves not only to improve the antistatic properties of the polyphenylene ether resin but also to reduce odor and increase impact strength. As a result, particularly desirable thermoplastic compositions are obtained.

DESCRIPTION OF THE INVENTION

While any polyphenylene ether resin may be employed in the compositions of the present invention, preferred are homopolymeric or copolymeric resins having the formula:

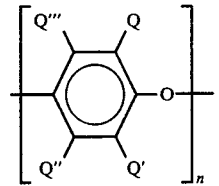

wherein the oxygen ether atom of one unit is connected to the benzene nucleus of the next adjoining unit, n represents the total number of monomer residues and is a positive integer of at least 50, e.g., from 50 to about 200 and Q, Q', Q" and Q'" are independently selected from the group consisting of hydrogen, halogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and the phenol nucleus, and Q and Q' in addition may be halogen provided that Q and Q' are preferably free of a tertiary carbon atom.

Still more preferably, within the above formula Q and Q' and alkyl, especially alkyl having from 1 to 4 carbon atoms. Illustratively, such resins include poly(2,6-dimethyl-1,4-phenylene)ether; poly(2,6-diethyl-1,4-phenylene)ether; poly(2-methyl-6-ethylphenylene)ether; poly(2-methyl-6-propyl-1,4-phenylene)ether; poly(2,6-dipropyl-phenylene)ether; poly(2-ethyl-6-propyl-1,4-phenylene)ether; and the like.

Especially preferred is poly(2,6-dimethyl-1,4-phenylene)ether, preferably having an intrinsic viscosity of from about 0.4 to 0.8, more preferably about 0.45 deciliters per gram (dl/g.) measured in solution in chloroform at 30° C.

These compositions also desirably contain styrene resin to improve their physical properties. The styrene resins preferably are those having at least 25% by weight of repeating units derived from a vinyl aromatic compound of the formula:

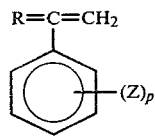

wherein R is hydrogen, (lower)alkyl or halogen; Z is vinyl, halogen or (lower)alkyl; and p is 0 or an integer for from 1 to the number of replaceable hydrogen atoms on the benzene nucleus. Herein, the term "(lower)alkyl" means alkyl of from 1 to 6 carbon atoms.

The term "styrene resin" as used broadly throughout this disclosure includes, by way of example, homopolymers such as polystyrene and polychlorostyrene, as well as polystyrenes which have been modified by natural or synthetic rubber, e.g., polybutadiene, polyisoprene, butyl rubber, EPDM rubber, ethylene-propylene copolymers, natural rubber, polysulfide rubbers, polyurethane rubbers, epichlorohydrin, and the like; styrene containing copolymers such as the styrene-acrylonitrile copolymers (SAN) styrene-butadiene copolymers, styrene-maleic anhydride copolymers, styrene-acrylonitrile-butadiene terpolymers (ABS), poly-α-methylstyrene, copolymers of ethylvinylbenzene and divinylbenzene, and the like; block copolymers of the A-B-A and A-B type wherein A is polystyrene and B is an elastomeric diene, e.g., polybutadiene, radial teleblock copolymers of styrene and a conjugated diene, acrylic resin modified styrenebutadiene resins and the like and blends of homopolystyrene and copolymers of the aforementioned types.

The styrene resin may be present in any amount. Widely divergent proportions of from 1:99 to 99:1 by weight of polyphenylene ether resin are known. More desirably, these two resins are in a weight ratio of from about 1:5 to 5:1, most preferably about 1:1 for use in the present compositions.

The antistatic agent is commercially available and methods of its preparation are known. It can be prepared, for instance, by reacting approximately equimolar amounts of the corresponding tertiary amine and paratoluenemethyl sulfonate in the presence of a solvent, e.g., water, at a slightly elevated temperature, e.g., 60°–80° C., until the compound is formed.

In general, the antistatic agent is present in an amount of at least 3% and preferably from 3 to 5% by weight of total thermoplastic resin. Amounts in excess of this normally do not provide any further improvements in antistatic behavior and may detract from other properties of the composition.

The enhancer for the antistatic agent and composition is polyethylene glycol ester. Although the acid upon which the acid is based is relatively unimportant, the ester is most commonly of an aliphatic, preferably saturated, acid having from 2 to 5 carbons. These acids must, of course be polyfunctional; they are preferably dicarboxylic acids. The enhancer desirably has a molecular weight of from about 100 to 500, with about 200 being preferred.

The amount of enhancer employed is not critical and may vary widely. Generally, however, a ratio of from 1:3 to 2:1, most preferably from 1:2 to 1:1 by weight of antistatic agent is present. From about 1.5 to 3% by weight of thermoplastic resin is also particularly desirable.

The manner in which the present compositions are prepared is not critical. In one procedure, a blend premix is formed by tumbling the ingredients. The blend premix is passed through an extruder at an elevated temperature, e.g., from about 300° to about 400° C., dependent on the needs of the particular composition. The extrudate is cooled and chopped into pellets and the pellets are molded into any desired shape.

Other ingredients can also be included for their conventionally employed purposes. These include drip retardants, fire retardants, odor retardants, plasticizers, antioxidants, stabilizers, reinforcing agents, pigments dyes, processing aids, and the like.

The following examples are given by way of illustration only and are not intended as a limitation on the scope of this invention. Many variations are possible without departing from its spirit and scope. Unless otherwise specified herein, all proportions are provided on a weight basis.

In the examples, the antistatic behavior is measured according to the following procedure; a molded test piece is placed near finely divided cigarette ashes. The antistatic behavior is considered "good" if not even trace amounts of the cigarette ashes are attracted. The other physical properties are evaluated according to ASTM standards.

EXAMPLES

A resin composition is prepared by tumbling the following ingredients:

| Ingredients | Party-by-Weight |
|---|---|
| Poly(2,6-dimethyl-1,4-polyphenylene ether) | 40.00 |
| Rubber-modified high impact polystyrene (FG-834, produced by the Foster Grant Co.) | 60.00 |
| Mixed triaryl phosphate (flame retardant) (Kronitex 50, produced by FMC Corp.) | 8.00 |
| Low molecular weight polyethylene (Rexene 126, produced by Dart Industries) | 1.50 |
| Phosphite stabilizer | .50 |
| Zinc sulfide | .15 |
| Zinc oxide | .15 |

After intimate admixture, the resin composition is divided into six separate samples numbered 1 through 6.

To respective samples are added the amounts of N,N-bis-(2-hydroxyethyl)-N-octyl-N-methyl ammonium para toluene sulfonate salt antistatic agent (1) (Hexcel 106-G, produced by Hexcel Fine Chemicals) and an antistatic agent (2) comprising polyethylene glycol ester having a molecular weight of about 200 (Nocostat 2152-P manufactured by Diamond Shamrock) set forth in the below Table.

These comparative samples are then passed through an extruder at about 350° C. The extrudates are chopped into pellets and molded at an injection cylinder temperature of about 300° C. and mold temperature of about 80° C. The molded product compositions are then tested for static and other significant physical characteristics to obtain the remaining data in the Table.

TABLE

| EXAMPLE NUMBER | 1* | 2 | 3* | 4* | 5 | 6 |
|---|---|---|---|---|---|---|
| Resin Composition | 110.3 | 110.3 | 110.3 | 110.3 | 110.3 | 110.3 |

TABLE-continued

| EXAMPLE NUMBER | 1* | 2 | 3* | 4* | 5 | 6 |
|---|---|---|---|---|---|---|
| Antistatic Agent (1) | — | 3.0 | — | — | 3.0 | 3.0 |
| Antistatic Agent (2) | — | — | 1.5 | 3.0 | 1.0 | 3.0 |
| PROPERTIES | | | | | | |
| Tensile Strength (psi) | 8200 | 7500 | 7500 | 7500 | 7100 | 7700 |
| Elongation (%) | 86 | 75 | 70 | 64 | 67 | 58 |
| Izod. imp. at RT. (ft.lb./in.n.) | 4.3 | 5.9 | 5.3 | 5.0 | 6.5 | 6.4 |
| Flexural Strength (psi) | 10,700 | 10,100 | 9700 | 9400 | 8800 | 9500 |
| Flexural Mod. (psi) | 356,000 | 335,000 | 321,000 | 316,000 | 326,000 | 325,000 |
| HDT (°F.) | 201 | 201 | 194 | 183 | 194 | 206 |
| Surface Resistivity (OHM) | $10^{17}$ | $5 \times 10^{10}$ | $3 \times 10^{11}$ | $>10^{12}$ | $8 \times 10^7$ | $7.5 \times 10^7$ |
| Antistatic Behavior | None | Excellent | Poor | None | Excellent | Excellent |

*comparison experiment

The data in the Table reveals a substantial improvement for the thermoplastic compositions of the present invention.

Comparing Example Nos. 1 and 2, some advantages for the antistatic agent (1) alone are evident. The changes in surface resistivity and antistatic behavior are clearly beneficial. In addition, some desirable increase in Izod impact strength is observable. Continuing the comparison by further reference to Example Nos. 3 and 4, it is apparent that antistatic agent (2) alone is significantly less effective. Most importantly, surface resistivity, antistatic behaviour and impact strength are not only below the respective values for the antistatic agent (1) containing composition (Example No. 2) but deteriorate further with increase in amount of antistatic agent (2) (Example Nos. 3 and 4).

Quite unexpectedly, after these results, the combination of both antistatic agent (1) and agent (2) (Example Nos. 5 and 6) provides dramatic improvements in each of the foregoing properties. Moreover, in contradistinction from the above discussed trend apparent in Example Nos. 3 and 4, the addition of further agent (2) between Example Nos. 5 and 6 does not adversely affect these properties.

This compositional flexibility is both unexpected and beneficial. Odor tests conducted on the samples further show that agent (2) perceptively retards the generation of odor from the samples. Consequently, higher concentrations of agent (2) can be utilized to allow more elevated compounding and molding temperature during processing of the present compositions.

All of the foregoing patents and/or publications are incorporated herein by reference. Obviously, other modifications and variations of the present invention are possible in the light of the above teachings. For example, instead of poly(2,6-dimethyl-1,4-phenylene)ether there can be substituted poly(2,6-dimethyl-co-2,3,6-trimethyl-1,4-phenylene)ether copolymer. In addition, conventional reinforcements and/or fillers, flame retardants, stabilizers, colorants, impact modifiers, can be used in conventional amounts. It is, therefore, to be understood that changes may be made in the particular embodiments of the invention described which are within the full intended scope of the invention as defined by the appended claims.

I claim:

1. An antistatic thermoplastic resin composition which comprises:
    (a) a polyphenylene ether resin with or without a styrene resin;
    (b) a minor, effective amount of an antistatic agent comprising a compound having the formula

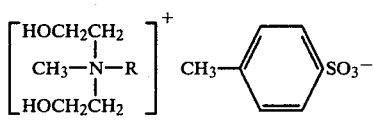

wherein R is octyl; and
    (c) a minor, effective amount of an enhancer for the antistatic agent (b), comprising a second antistatic agent which is a polyethylene glycol ester.

2. A composition as defined in claim 1, wherein the enhancer has an average molecular weight of from 100 to 500.

3. A composition as defined in claim 2, wherein the enhancer is an ester of aliphatic dicarboxylic acid having from 2 to 5 carbons.

4. A composition as defined in claim 3, wherein the enhancer and antistatic agent are in a weight ratio of from 1:3 to 2:1.

5. A composition as defined in claim 4, wherein the enhancer is present in from about 1.0 to 3% by weight of thermoplastic resin.

6. A composition as defined in claim 5, wherein the antistatic agent is present in an amount of from about 3 to 5% by weight of thermoplastic resin.

7. A composition as defined in claim 6, wherein the polyphenylene ether resin has the formula:

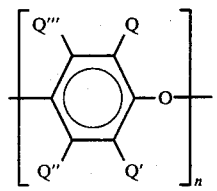

wherein the oxygen ether atom of one unit is connected to the benzene nucleus of the next adjoining unit, n represents the total number of monomer residues and is a positive integer of at least 50, and Q, Q', Q" and Q"' are independently selected from the group consisting of hydrogen, halogen, hydrocarbon radicals, halohydrocarbon radicals having at least two carbon atoms between the halogen atom and the phenyl nucleus, hydrocarbonoxy radicals and halohydrocarbonoxy radicals having at least two carbon atoms between the halogen atom and phenol nucleus.

8. A composition as defined in claim 7, wherein said composition additionally contains styrene resin which is rubber-modified high impact polystyrene.

* * * * *